United States Patent [19]

Brown

[11] Patent Number: 4,491,960
[45] Date of Patent: Jan. 1, 1985

[54] HANDPRINTED SYMBOL RECOGNITION SYSTEM

[75] Inventor: Robert M. Brown, Carriere, Miss.

[73] Assignee: The United States of America as represented by the Secretary of the Navy, Washington, D.C.

[21] Appl. No.: 365,857

[22] Filed: Apr. 5, 1982

[51] Int. Cl.³ .................... G06K 9/46; G06K 9/68
[52] U.S. Cl. ................................. 382/26; 382/37
[58] Field of Search ............... 382/25, 26, 37, 38

[56] References Cited

U.S. PATENT DOCUMENTS

| 3,430,198 | 2/1969 | Gattner et al. | 382/26 |
|---|---|---|---|
| 3,636,513 | 1/1972 | Tisdale | 382/26 |
| 3,999,161 | 12/1976 | Bilzem et al. | 382/25 |
| 4,040,009 | 8/1977 | Kadota et al. | 382/38 |
| 4,193,056 | 5/1980 | Morita et al. | 382/25 |
| 4,259,661 | 3/1981 | Todd | 382/37 |

OTHER PUBLICATIONS

"An Application of Optical Character Recognition Techniques for the Digitization of Alpa-Numerics at the Defense Mapping Agency (DMA)-Part 1", Proceedings, American Congress on Surveying and Mapping, 38th Annual Meeting, (1978), pp. 140–170, by Gronmeyer et al.

Primary Examiner—John C. Martin
Assistant Examiner—Michael D. Parker
Attorney, Agent, or Firm—R. F. Beers; F. I. Gray

[57] ABSTRACT

A handprinted symbol recognition system for identifying through computer techniques free-form, unconstrained handprinting in which accuracy is decoupled from efficiency converts a thin-line (skeletonized) figure output from a preprocessing system, in the form of an array of "black" image points from a raster line sampling, into segment-oriented lists. The segment-oriented lists are filtered and data compressed to obtain a reduced more suitable subset of points approximating the symbol for further processing. The topologic features of the image are extracted from the subset. Short segments that are potential spurs are removed, the image is rotated as necessary and normalized as to size. Each segment and their interrelationships are analyzed to extract geometric features for use in conjunction with the topologic features in a logic tree decision mechanism which uses three modules: (1) pre-recognition ("trash" filter), (2) potential symbol identification, and (3) final quality assurance. The pre-recognition module separates all possible non-meaningful images from those the recognition system has a chance of identifying with minimal misclassification. The symbol identification module uses a decision tree approach in which the most reliable and "rugged" features (relative to real-world scanner data) are placed at the top of the tree. The quality assurance module asks more precise questions about the tentatively identified symbol to determine if it is indeed the particular symbol in question, i.e., the symbol meets a sufficient class membership (SCM) criterion.

8 Claims, 2 Drawing Figures

HANDPRINTED SYMBOL RECOGNITION SYSTEM

BACKGROUND OF THE INVENTION

1. Field of the Invention

The present invention relates to data and information processing, and more particularly to a handprinted symbol recognition system for translating free-form, unconstrained handwriting into computer compatible symbols (codes).

2. Description of the Prior Art

Recognition of patterns in the context of wide variability within classes over an extensive range of possible classes, completely unknown or random events, high levels of distortion and preprocessing artifacts, and high accuracy requirements, i.e., no mistakes, false alarms, etc., is a major research and development topic in the area of information extraction and analysis. Large amounts of data are often recorded in free-form unconstrained handwriting which subsequently must be translated to computer compatible symbology. A significant example of this is provided by the problem of computer identification of unconstrained, free-form handwritten symbols that occur on bathymetric, hydrographic and cartographic manuscripts.

Presently the reduction of hydrographic survey data to usable chart form extensively involves generation, editing, review, translation and merging of vast quantities of handwritten information. Considerable efforts have been expended to develop raster scanner technology needed to generate digital image data. As a result computer automated scanning and "digitizing" procedures could greatly improve the efficiency and throughput of these largely manual operations. The key element in such an automated system is a sufficiently reliable technique for recognizing the wide variety of unconstrained handprinting used in the preparation of bathymetric charts. The quality of the handprinting can impact upon both the efficiency and the accuracy, therefore, the accuracy should be solely dependent upon the recognition system, i.e., it should be decoupled from the efficiency.

Such automated raster scan procedures create vast quantities of data ($\sim 10^8$ bits per $40'' \times 60''$ document). In the image domain of line drawings, various data compression techniques are available; e.g., raster-to-lineal conversion, run-length coding, etc. However, for symbolic information such as depth soundings, names and oceanographic signs, the end product is a binary or computer code; e.g., the ASCII code for the letter or digit. When data is in this compact form, it can be easily stored in information data banks and can be managed (retrieved, updated, sorted, cross-referenced, etc.) under electronic/computer control.

In the area of handprinted symbol recognition it is common for techniques to achieve 95% to 98% accuracies where the data input variability is constrained. (See: C. Y. Suen et al, "Automated Recognition of Handprinted Characters—The State of the Art," *Proceedings of the IEEE,* Vol. 68, No. 4, April 1980.) However, results for such ideal optical character recognition data are not applicable where the requirement is for near-zero substitution errors (100% accuracy) in the presence of "random events" of their realistic data products with efficiencies in the neighborhood of 95%. Also, typical accuracy levels for machine print (very constrained/regular symbols) are from one to five errors per ten thousand and the pages must be clean and well-formatted using only certain kinds of ribbons and papers. Efficiencies are only somewhat lower, but the documents cannot contain "trash" or "unknown" symbols.

The assignment of a computer compatible code to the various symbols occurring in the cartographic manuscript input can be divided into the following scanning/recognition processing steps:

1. The handwritten document must be scanned with a suitable optical/digital system to produce a sampled image in raster format.
2. The image must be thresholded and noise must be removed.
3. Individual symbols must be located, isolated and tagged.
4. The isolated subrasters must be identified, i.e., recognized or classified.
5. The digits or "characters" making up a sounding or word ("name") must be reassembled and associated with the correct (geographic) location on the document.

The recognition portion of the overall "digitization" task should operate on individual, isolated symbols without knowledge of the specific symbols in the immediate region of the manuscript, i.e., they must be identified "out of context". The recognition of isolated symbols has two closely interacting elements: preprocessing of the subraster image and symbol identification. The preprocessing generally is concerned with raster smoothing and filling, orientation correction and "thinning". These tasks remove irrelevant character variation, simplify the character structure, reduce noise and perform an initial data compression. The basic result of the preprocessing stage is a "stick-figure image" in which the interclass variations have been accentuated to the extent possible while reducing intraclass variations.

What is desired is a recognition system that extracts features from these "thinned figures" and executes a decision mechanism based on the values of these features to produce a virtually 100% accurate result. To accomplish this result the accuracy should decoupled from the efficiency.

SUMMARY OF THE INVENTION

Accordingly, the present invention provides a handprinted symbol recognition system for identifying, through computer techniques, free-form, unconstrained handprinting in which the accuracy is decoupled from the efficiency. A thin-line (skeletonized) figure output from a preprocessing system, in the form of an array of "black" image points from a raster line sampling, is converted into segment-oriented lists. The segment-oriented lists are filtered and data compressed to obtain a reduced, more suitable subset of points approximating the symbol for further processing. The topologic features of the image are extracted from the subset. Short segments that are potential spurs are removed, the image is rotated as necessary and normalized as to size. Each segment and their interrelationships are analyzed to extract geometric features for use in conjunction with the topologic features in a logic tree decision mechanism.

The logic tree decision mechanism is a three-module approach: (1) pre-recognition ("trash" filter), (2) potential symbol identification, and (3) final quality assurance. The pre-recognition module separates all possible non-meaningful images from those the recognition system has a chance of identifying with minimal misclassification. The symbol identification module uses a decision tree approach in which the most reliable and "rugged" features (relative to real-world scanner data) are placed at the top of the tree. Successful features emphasize global properties of the symbol being analyzed: their calculation involves as many image points as possible; they organize the symbol information content in terms of the segments which compose it; the number of global segments, their relative orientation, and connectivity are rugged features since they depend on the reasonably stable properties of end points, branch points and enclosed regions; individual segments are analyzed in toto for their general shape, e.g., curved, straight, spiral, etc.; and these features make extensive use of the concepts of rotation independence and the relative angles between various parts of the symbol. The quality assurance module asks more precise questions about the tentatively identified symbol to determine if it is indeed the particular symbol in question, i.e., the symbol meets a sufficient class membership (SCM) criterion.

Therefore it is an object of the present invention to provide a handprinted symbol recognition system to identify free-form, unconstrained handwritten symbols in which accuracies are solely dependent upon the system, i.e., the accuracy is decoupled from the efficiency.

Another object of the present invention is to provide a handprinted symbol recognition system which has virtually 100% accuracy with efficiencies depending on the quality of the handprinted symbols, efficiencies on "reasonably clean" documents being greater than 95%.

Yet another object of the present invention is to provide a handprinted symbol recognition system which is flexible and readily allows for the expansion of a given target subset of symbols to be recognized.

Other objects, advantages and novel features of the present invention will be apparent from the following detailed description when read in conjunction with the appended claims and attached drawing.

DESCRIPTION OF THE PREFERRED EMBODIMENT

Figure 1:
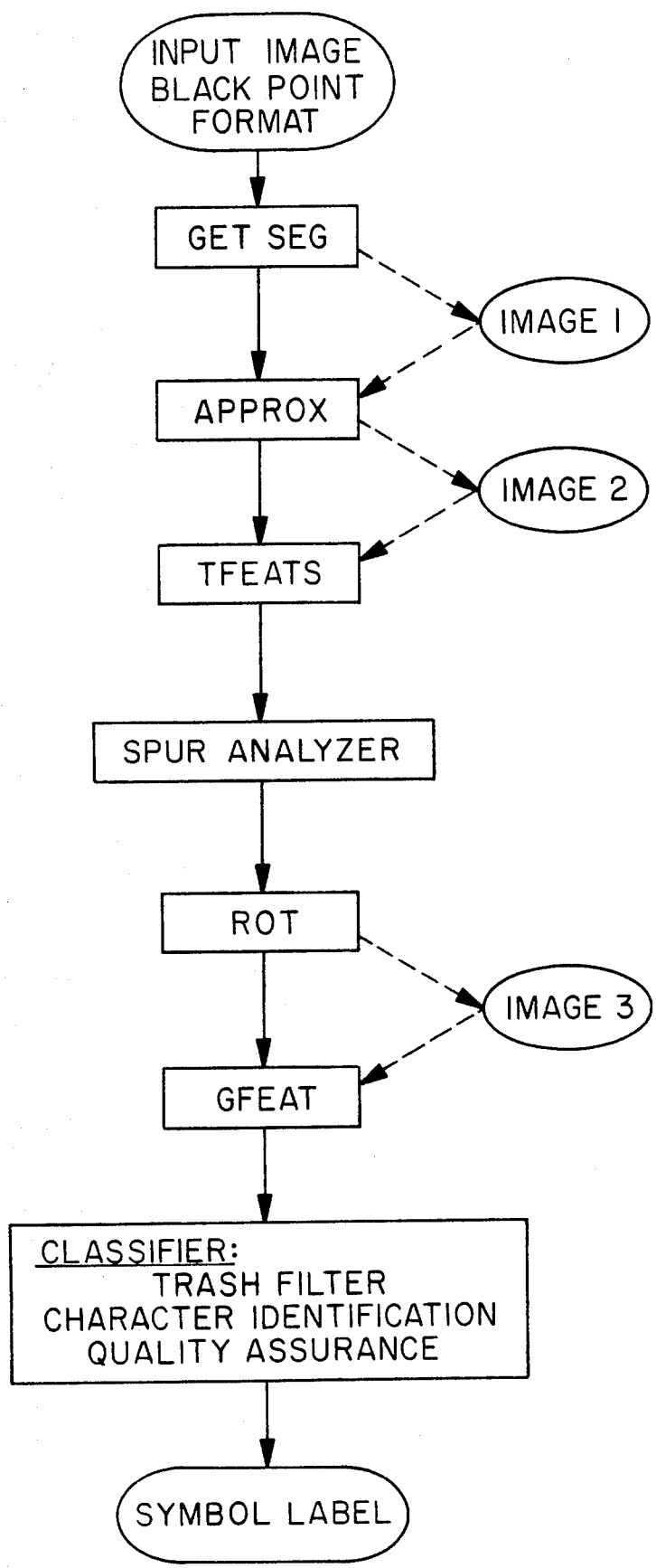
FIG. 1 is a flow chart of the handprinted symbol recognition system processing sequence.

Referring to FIG. 1 an input image in a black point format from a raster scan line sampling, skeletonized by a preprocessing subsystem, is input to a segment analysis module, GETSEG. The description of the black point image is a list of (x,y) coordinates for the image points that are "black" in the raster scan line sampling. GETSEG converts the black point image format into segment-oriented lists, IMAGE 1. For example the numeral "8" may be divided into three segments—an upper loop, a lower loop and a short horizontal segment between the loops. An APPROX module acts as a filter and data compressor for the segment-oriented lists. Many points on each segment are processed to arrive at a fewer number of selected points to describe the segment. Besides reducing the total number of points to be processed by the remainder of the recognition system, this image description, IMAGE 2, suppresses or filters out local variations.

A topology feature generator (TFEATS) identifies from IMAGE 2 such things as number of connected components (NCC), number of enclosed regions (NER), number of isolated points (NIP), various types of branch points (BP), etc. IMAGE 2 is then prepared for geometrical analysis by the modules SPUR and ROT. SPUR is a spur analyzer which identifies short segments that are potential spurs and, if necessary, removes them. ROT calculates an orientation angle, rotates IMAGE 2 by that amount, and normalizes its size. The resulting output image, IMAGE 3, is now represented as a real number array. An eigen-axis approach may be used for the orientation algorithm to place all symbols of a given class into a reasonably standard orientation.

A geometric feature generator (GFEATS) module analyzes each segment of IMAGE 3 and their interrelationships, and calculates geometric features for use in conjunction with the topologic features in a logic tree mechanism.

A three-module approach uses the geometric and topologic feature information to identify the corresponding symbol. The first module is a pre-recognition, or "trash" filter, module. The "trash" filter is designed to separate all possible non-meaningful images from those that the recognition system has a chance of identifying with minimal misclassification. The features in this module are specifically designed to recognize "trash", i.e., to identify the fact that a legitimate character is not present. Examples of feature vector components that measure "trash" are the height and width of the image and the ratio of height to width, the density of the points, a measurement of the number of holes or breaks, and the complexity or number of curve segments. Since these features are designed specifically to perform this "garbage collection" function, they are not all useful in actually classifying characters.

If the image is not rejected by the "trash" filter, it passes to a second module, a symbol identification module. This module uses a feature selection/decision tree approach in which the most reliable and "rugged" features (relative to real-world scanner data) are placed at the top of the tree. The determination of the suitability of a given feature concept is an empirical problem, especially in view of the complex symbol environment being considered. Such features should be tolerant of intraclass variations, rugged with respect to noise, and discriminating between class variations. The logic tree approach used operates on the features extracted by the feature extraction process (TFEATS and GFEATS). The most successful features emphasize global properties of the symbol being analyzed. The organization of the recognition logic as a binary decision tree provides an effective mechanism for implementing feature selection and evaluation.

After a symbol has been tentatively identified, more precise questions are asked to determine if it is indeed the particular symbol in question. This function is served by the third module, the quality assurance or post-recognition module. By knowing that an image is tentatively a "5", for example, and that it has been separated from all other possible symbols, (for example, that it is not a "2" or an "7"), more particular information or symbol specific features can be extracted which lowers the possibility of a misclassification or substitution error. Thus, this final module establishes that the symbol meets a sufficient class membership (SCM) criterion. A set of feature vector components for a character meets this SCM criterion if their specification "guarantees" that the pattern inside the subraster contains the necessary shape characteristics to justify, in terms of human recognizer judgments, the assignment to the character class in question. Thus, if a human recognizer is given the selected feature components, he would agree that the given character being described is the only possible character. The use of the SCM criterion effectively allows an expansion of the number of possible classes which the HSR system can handle by lumping the "infinite trash universe" into a single rejection class, and it is a critical element in achieving the very low substitution rates required.

In more detail GETSEG analyzes the input image for connectivity between points and produces an ordered point list with a segment descriptor table as an index. Each segment is defined as a connected series of points between two end points, an end point and a branch point, or two branch points. For example the numeral "3" has three end points and one branch point. This numeral is divided into three segments: from the upper end point around the upper loop to the branch point at the center; from the branch point around the lower loop to the bottom end point; and from the branch point to the middle end point.

APPROX examines each segment from GETSEG (IMAGE 1) and reduces the number of points needed to define the segment. For example, the numeral "1" may be defined by only two points, the upper and lower end points, while the numeral "7" may be defined by three points, the upper and lower end points and the inflection point. For curved segments such as occur in the numerals "3" or "8" more points are required to define the curvature segments.

IMAGE 2 from APPROX is input to TFEATS where the topology of the image is defined. For example, information needed by subsequent modules include number of segments, number of end points, number of branch points, number of enclosed regions, number of connected components, etc. Thus, each image has a corresponding table of topologic features.

After any spurs have been identified and eliminated, if necessary, and the image has been rotated and normalized, IMAGE 3 is presented in terms of a real number array. GFEATS then calculates geometric features of the image such as height, width, areas, angles, distances, etc. The table of geometric features together with the table of topologic features is input to the classifier.

Figure 2:
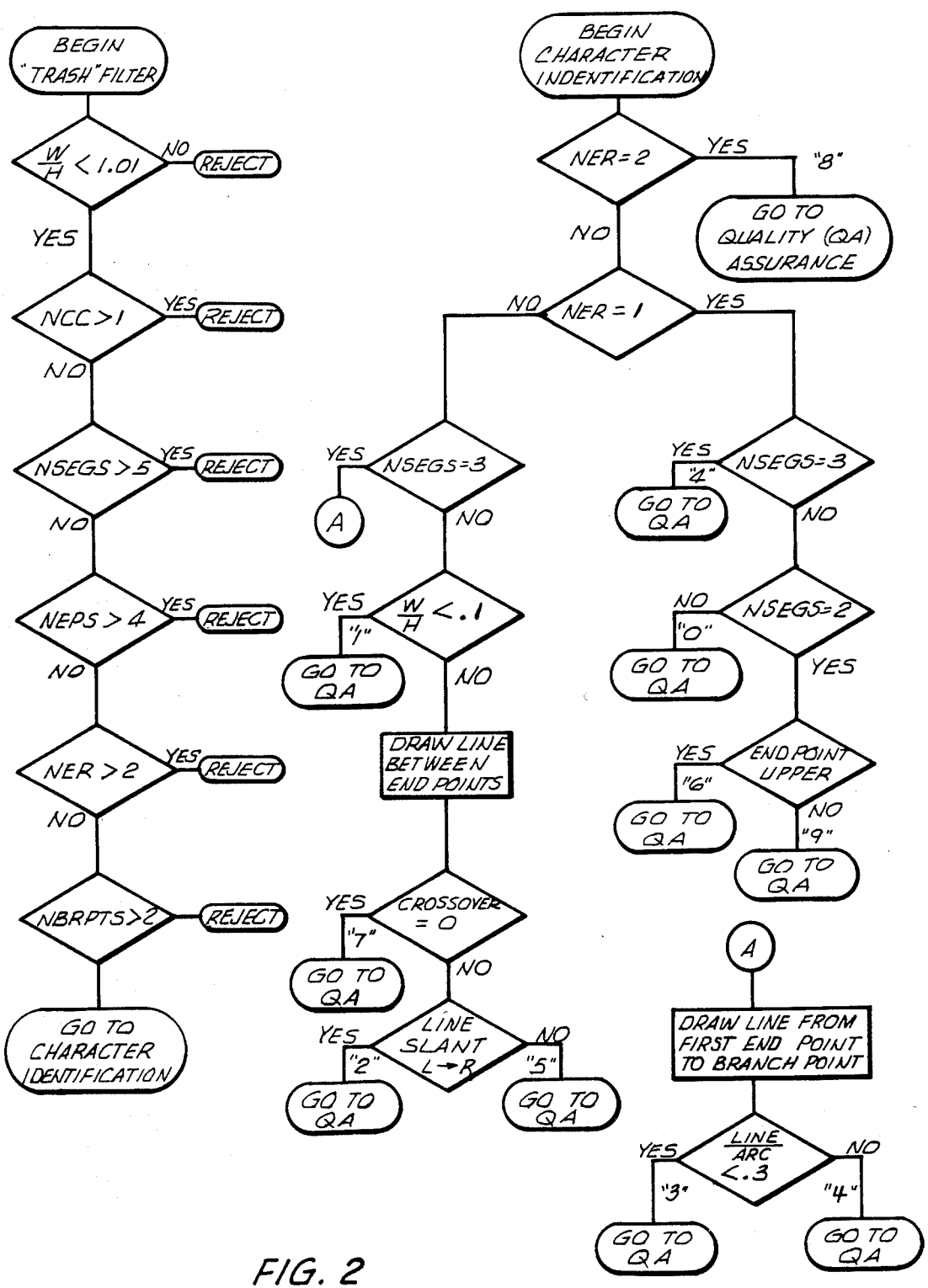
FIG. 2 is a detailed flow chart of the pre-recognition and symbol identification modules.

The trash filter module tests the topologic and geometric features against given parameters to reject all images which have no characteristics common to any symbol within a target subset of symbols. For example as shown in FIG. 2, for a numerical target subset of symbols the following parameters may be used:

width/height (W/H)$\leq$1.01
number of connected components (NCC)=1
number of segments (NSEGS)$\leq$5
number of end points (NEPS)$\leq$4
number of enclosed regions (NER)$\leq$2
number of branch points (NBRPTS)$\leq$2.

All legitimate numerals within the target subset satisfy the above parameters, so that any images which do not pass all these parameters are rejected as "trash".

The topologic features for each numeral may be defined as shown in the following table:

| NUMERAL | NER | NSEGS |
|---------|-----|-------|
| 0 | 1 | 1 |
| 1 | 0 | 1 |
| 2 | 0 | 1 |
| 3 | 0 | 3 |
| 4 | 0 | 3 (open top) |
|   | 1 | 3 (closed top) |
|   |   | 4 (x'd top) |
| 5 | 0 | 1 |
| 6 | 1 | 2 |
| 7 | 0 | 1 |
| 8 | 2 |   |
| 9 | 1 | 2 |

The identifier module first tests NER for NER=2. This defines the numeral "8". Then NER=1 is tested to separate the numerals 0, 4 (closed top), 6, and 9 from 1, 2, 3, 4 (open top), 5 and 7. Likewise, NSEGS=3 and NSEGS=2 are tested to further separate the image into groups of (1) 3 and 4 (open top), (2) 1, 2, 5 and 7, (3) 4 (closed top), and (4) 6 and 9. The topologic features alone may define "0" and "8".

Now geometric features are examined. "1" can be separated from 2, 5 and 7 by defining a narrow width/height ratio. The number of times the image crosses a line drawn between the end points separates the "7" from 2 and 5, and the slant of the line differentiates between a "2" and a "5". The slant may be determined by drawing an orthogonal system at each end point with the slant line, and then determining the quadrant through which the segment leaves from the end point. The "6" is separated from the "9" by determining the location of the enclosed region, either lower or upper part of image. This may be done by defining a box around the image and determining whether the end point is in the upper 50% or lower 50% of the rows of image points. Finally, "3" is differentiated from the open top 4 by the ratio of the distance of a line from the first end point to the branch point divided by the actual arc distance along the image points. Thus, all the numerals are tentatively identified and ready to be tested by the quality assurance module.

The quality assurance module tests each tentatively identified character symbol in detail. For example, a "7" has a leftward facing opening and an acute angle inflection with the length across the top (or width) less than the height. A "2" has a left facing opening at the top, a right facing opening at the bottom, a curved top and an acute inflection angle at the bottom. Such SCM criterion are applied to all the images. Any images, or tentatively identified characters, which do not pass these criterion will be finally rejected as "trash". The result is virtually 100% accuracy regardless of the quality of the initial handprinted information.

Thus, the present invention provides a handprinted symbol recognition system which identifies a free-form, unconstrained handwritten symbol using computer techniques. The system eliminates "trash" and provides virtually 100% accuracy with an efficiency of at least 95% on "reasonably clean" documents, the accuracy being decoupled from the efficiency. Also, the system readily allows for the expansion of the given target subset of symbols to be recognized.

What is claimed is:

1. A handprinted symbol recognition system comprising:
    means for obtaining topologic and geometric rugged features from a skeletonized raster scan line sample image representative of a single handprinted symbol;

means for filtering said topologic and geometric features by testing against given parameters to eliminate said image when said image has no characteristic common to any symbol within a target subset of symbols;

means using a feature selection/decision tree approach for tentatively identifying said handprinted symbol from said target subset corresponding to said image when said image is passed by said filtering means; and means for assuring that said handprinted symbol identified by said identifying means satisfies a sufficient class membership criterion by applying more specific features to said handprinted symbol;

whereby identification accuracy is decoupled from efficiency.

2. A handprinted symbol recognition system as recited in claim 1 wherein said obtaining means comprises:

means for segmenting said skeletonized image to form segment-oriented lists;

a topology feature generator to identify from said segment-oriented lists selected topologic features;

means for orienting and normalizing said segment-oriented lists to produce a real number array for said image; and a geometric feature generator to analyze each segment of said real number array and the interrelationship between segments to calculate selected geometric features;

said topologic and geometric features being defined to be rugged to noise, tolerant of variations of said handprinted symbol, and discriminatory between different ones of said handprinted symbols.

3. A handprinted symbol recognition system as recited in claim 2 wherein said filtering means comprises a pre-recognition filter which tests said topologic and geometric features against given parameters to reject said image which has no characteristic common to any recognizable handprinted symbol within a given target subset of symbols.

4. A handprinted symbol recognition system as recited in claim 3 wherein said identifying means comprises a decision tree logic which tests said topologic and geometric features for said image by means of successive binary decisions to tentatively identify said handprinted symbol.

5. A handprinted symbol recognition system as recited in claim 4 wherein said assuring means comprises a post-recognition module which tests said tentatively identified handprinted symbol against more specific ones of said topologic and geometric features to lower the possibility of a misclassification by establishing said tentatively identified handprinted symbol meets said sufficient class membership criterion.

6. A handprinted symbol recognition system as recited in claims 2 or 5 wherein said obtaining means further comprises an approximation module to act as a filter and data compressor for said segment-oriented lists by reducing the number of points to describe each segment and to filter out local variations prior to identifying said selected topologic features.

7. A handprinted symbol recognition system as recited in claim 6 wherein said obtaining means further comprises means for identifying and removing short segments that are potential spurs prior to analyzing each segment for said selected geometric features.

8. An improved handprinted symbol recognition system having geometric and topologic feature information extracted from a skeletonized input image, the improvement comprising:

a pre-recognition module to separate all possible non-meaningful images from a target set of symbols based upon said geometric and topologic feature information;

a symbol identification module using a decision tree logic in which the most reliable of said geometric and topologic feature information emphasizing global properties of said input image is placed at the top of said decision tree logic to select the symbol from said target set corresponding to said input image; and a quality assurance module to ask more precise questions to determine that the selected symbol meets a sufficient class membership criterion.

* * * * *